United States Patent
Agosta et al.

(10) Patent No.: US 7,921,453 B2
(45) Date of Patent: Apr. 5, 2011

(54) AUTHENTICATED DISTRIBUTED DETECTION AND INFERENCE

(75) Inventors: John Mark Agosta, Palo Alto, CA (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1093 days.

(21) Appl. No.: 11/615,748

(22) Filed: Dec. 22, 2006

(65) Prior Publication Data

US 2008/0155656 A1 Jun. 26, 2008

(51) Int. Cl.
*G06F 15/16* (2006.01)
*H04L 29/06* (2006.01)
*G08B 23/00* (2006.01)

(52) U.S. Cl. ............. 726/4; 726/1; 726/2; 726/3; 726/6; 726/14; 726/16; 726/17; 726/23; 726/24; 726/25; 726/26; 726/27; 726/28; 726/29; 726/30; 713/1; 713/155; 713/161; 713/162; 713/169; 713/170; 713/193; 709/223; 709/224; 709/228

(58) Field of Classification Search ............. 726/1, 3–4, 726/22–26; 713/170
See application file for complete search history.

(56) References Cited

U.S. PATENT DOCUMENTS

| | | | | |
|---|---|---|---|---|
| 5,881,268 | A * | 3/1999 | McDonald et al. ............. | 703/21 |
| 6,763,458 | B1 * | 7/2004 | Watanabe et al. ............. | 713/100 |
| 7,403,988 | B1 * | 7/2008 | Blouin et al. ................. | 709/223 |
| 7,584,507 | B1 * | 9/2009 | Nucci ............................. | 726/23 |
| 2002/0129085 | A1 * | 9/2002 | Kubala et al. ................. | 709/104 |
| 2003/0009699 | A1 * | 1/2003 | Gupta et al. ................... | 713/201 |
| 2004/0177242 | A1 * | 9/2004 | Erickson et al. ................. | 713/2 |
| 2005/0138479 | A1 * | 6/2005 | Awada et al. ..................... | 714/38 |
| 2006/0010202 | A1 * | 1/2006 | Blackstock et al. .......... | 709/204 |
| 2006/0021054 | A1 * | 1/2006 | Costa et al. ..................... | 726/25 |
| 2006/0095963 | A1 | 5/2006 | Agosta et al. | |
| 2006/0117386 | A1 * | 6/2006 | Gupta et al. ..................... | 726/23 |
| 2006/0212749 | A1 * | 9/2006 | Kawahara et al. ................. | 714/6 |
| 2007/0110244 | A1 * | 5/2007 | Sood et al. ..................... | 380/270 |
| 2007/0156858 | A1 * | 7/2007 | Sood et al. ..................... | 709/220 |
| 2007/0192854 | A1 * | 8/2007 | Kelley et al. .................... | 726/22 |
| 2007/0271360 | A1 * | 11/2007 | Sahita et al. ................... | 709/223 |
| 2007/0277240 | A1 * | 11/2007 | Durfee et al. ................... | 726/24 |
| 2007/0294376 | A1 * | 12/2007 | Ayachitula et al. ........... | 709/220 |
| 2008/0005527 | A1 * | 1/2008 | Bang ............................. | 711/202 |

OTHER PUBLICATIONS

Ghosh and Sen, 2004, Springer-Verlag Berlin Heidelberg, Agent-Based Distributed Intrusion Alert System, pp. 241-251.*
Einwechter, Jan. 8, 2001, Symantec, An Introduction to Distributed Intrusion Detection Systems, pp. 1-5.*
Benattou et al, May 20, 2005, World Academy of Science and Engineering and Technology, Intelligent Agents for Distributed Intrusion Detection System, pp. 190-193.*

(Continued)

*Primary Examiner* — Christopher J Brown
*Assistant Examiner* — Jenise E Jackson
(74) *Attorney, Agent, or Firm* — Schwabe, Williamson & Wyatt, P.C.

(57) ABSTRACT

Embodiments of the present invention provide apparatuses, methods, and systems for authenticated distributed detection and inference. In various embodiments, an apparatus comprises an interface configured to communicatively couple a node hosting the apparatus to a network, and a distributed detection and inference (DDI) agent coupled to the interface and configured to receive, via the interface, DDI collaboration parameters from an authentication node is disclosed. Other embodiments may be described and claimed.

15 Claims, 4 Drawing Sheets

OTHER PUBLICATIONS

Abraham et al, 6.28/05, Computer Science Department Oklahoma State, D-SCIDS, pp. 82-98.*

U.S. Appl. No. 11/172,438, filed Jun. 29, 2005, Crosby et al.

DeLiberato, Daniel, et al., "Intel and Cisco Collaborate to Improve Enterprise Security," Techonology @ Intel Magazine, Sep. 2005, pp. 1-8.

* cited by examiner

AUTHENTICATED DISTRIBUTED DETECTION AND INFERENCE

TECHNICAL FIELD

Embodiments of the present invention relate to the field of networks, and more particularly, to authenticated distributed detection and inference in such networks.

BACKGROUND

The need for more advanced computer security has continued to rise as computer attacks have become more varied and sophisticated. Computer networks contain vital data and thus strong security measures are necessary to prevent the compromise of such data. However, conventional computer security does not provide adequate protection because it does not reflect how computer attacks have evolved.

Conventional security software and hardware includes virus/worm and intrusion detection and prevention systems. Conventional systems typically take the form of either network based devices, such as intrusion detection systems (IDS) and firewalls, or end system based software, such as virus detection software. Such systems are ill equipped to deal with many forms of attack. Network devices face the challenge of detecting increasingly sophisticated attacks on increasingly high-speed links. An IDS or firewall must be able to understand the potential threat of every conversation that traverses it. Moreover, such network perimeter-based protection systems cannot protect an enterprise from attacks that originate within the enterprise network, for example, from an infected laptop computer unwittingly attached to the corporate network by an employee.

The application of conventional security methods that rely on the use of signatures or rules, or on the use of so-called anomaly detectors, to detect the many varied types of attacks that can occur, results in a high incidence of false positives—alarms that are raised when in fact no attack has taken place, and false negatives—failures to sound an alarm when in fact an attack has taken place. In order to detect security violations, e.g., in order to avoid such failures, conventional systems may rely on overly sensitive detection, thereby creating false positives that greatly outnumber the number of true security threats that are detected, and thereby reducing system efficiency.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of this description, the phrase "A and/or B" means (A), (B), or (A and B); and the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

As used herein, reference to a "component" may refer to a hardware, a software, and/or a firmware component employed to obtain a desired outcome. Although only a given number of discrete components may be illustrated and/or described, such components may nonetheless be represented by additional components or fewer components without departing from the spirit and scope of embodiments of the invention.

Figure 1:
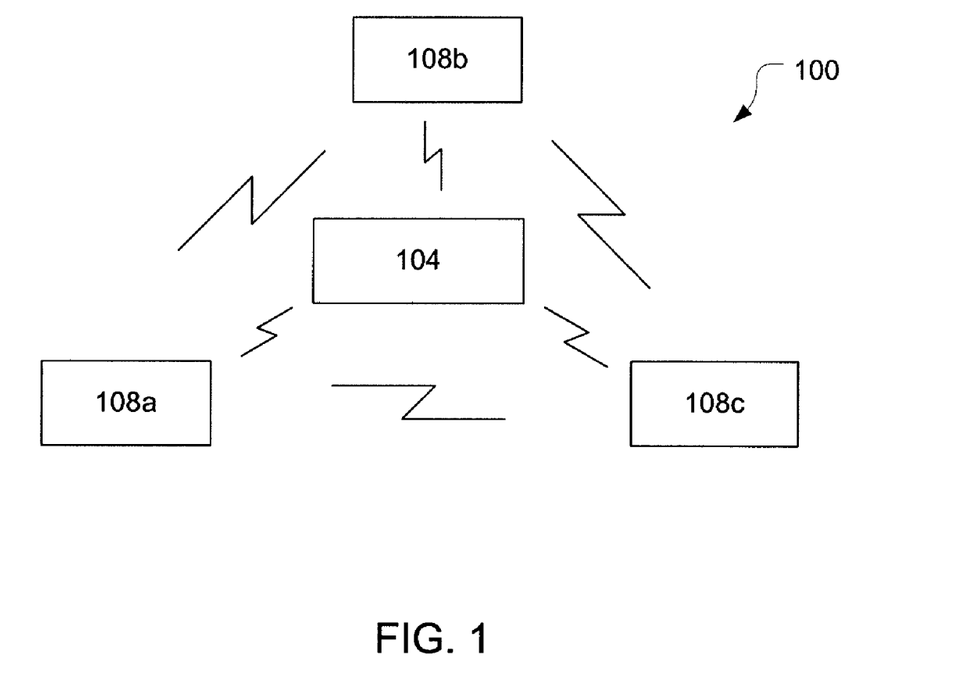
FIG. 1 schematically illustrates a distributed detection and inference network in accordance with various embodiments of this invention.

FIG. 1 illustrates a distributed detection and inference (DDI) network 100 in accordance with various embodiments of the present invention. In this embodiment, the network 100 may include an authentication node 104 and client devices 108a-108c coupled to one another via communication links as shown. The DDI network 100 may be a network of any of a variety of protocols, topologies, or designs.

Briefly, the client devices 108 may collaborate with one another to perform DDI operations. A DDI operation, as used herein, may be an operation to leverage detection of events among a number of network nodes to improve the accuracy of inferring a security breach, e.g., an attack from worms, viruses, etc., and/or an operational failure, e.g., a node with compromised availability or reliability, in the network. In an embodiment, the authentication node 104 may authenticate participants of DDI operations and distribute DDI collaboration parameters to the authenticated participants to govern collaboration.

In various embodiments, the security breach and/or operational failure in the network may not necessarily be on a node that is involved with the DDI operations.

The authentication node 104 and/or client devices 108 may be any type of device that is capable of communicating with other devices over the DDI network 100. Generally such devices may include personal computers, servers, access points, laptops, portable handheld computers (e.g., personal digital assistants or "PDAs"), set-top boxes, intelligent appliances, wireless telephones, etc.

In various embodiments, the DDI network 100 may be an enterprise network, or a sub-network thereof. An enterprise network may include a number of authentication nodes, similar to authentication node 104. The authentication nodes may maintain their own independent DDI network or may collaborate with other authentication nodes to varying degrees.

Figure 2:
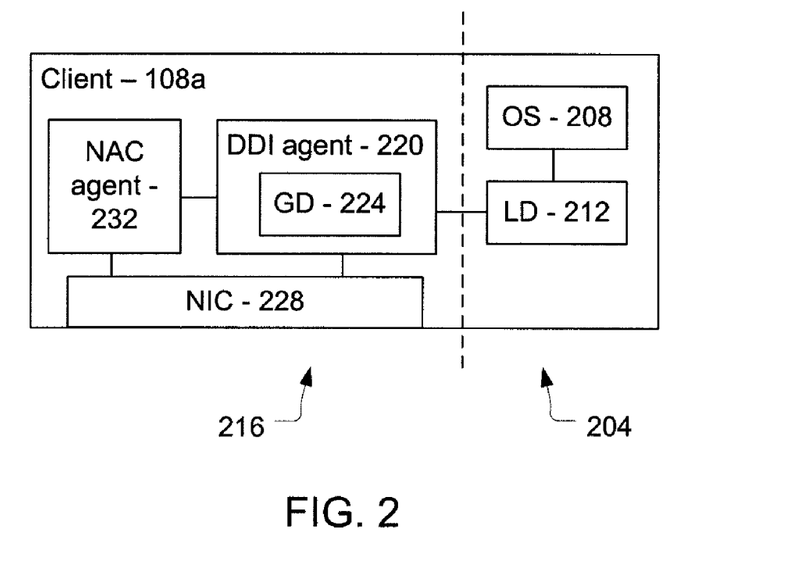
FIG. 2 schematically illustrates a client device in accordance with various embodiments of this invention.

FIG. 2 illustrates the client device 108a in accordance with various embodiments of the present invention. The client device 108a may include a host partition 204 having an operating system (OS) 208 to control other components operating in the host partition 204 to provide various user functions. The host partition 204 may also include a local detector (LD) 212 to determine a local belief about the state of the DDI network 100 by examining incoming and outgoing network traffic and by monitoring various components of the client device 108a in an effort to detect anomalies. The local belief may indicate a probability that there is a security breach and/or operational failure in the DDI network 100.

Whenever the LD 212 detects a suspicious event it may raise an alarm, which may lead to a high number of false positives, as discussed above. This relatively high number of false positives generated by the LD 212 may be compensated for by DDI operations described below.

The client device 108a may also have a dedicated partition 216. Components operating in the dedicated partition 216 may operate independently from the OS 208 of the host partition 204. This independent operation may be implemented through a hard partition (with each partition having dedicated hardware), a virtual partition (with each partition sharing hardware), or a combination thereof. The dedicated partition 216 may be capable of providing a safe, independently powered, independently connected execution environment that is separate from the OS 208 and any vulnerabilities associated with therewith.

The dedicated partition 216 may include a DDI agent 220 to perform various DDI operations of the client device 108a. The DDI agent 220 may include a global detector (GD) 224 and may be coupled to the LD 212 of the host partition 204 and to a network interface card (NIC) 228. The GD 224 may receive a local belief from the LD 212 and one or more other local beliefs from LDs located on other client devices 108 of the DDI network 100 via the NIC 228. The GD 224 may aggregate these local beliefs in order to generate a global belief about the state of the DDI network 100. The aggregation performed by the GD 224 may mitigate the high false positive rates of processing local beliefs in isolation from one another and, at the same time, increase detection sensitivity. In another embodiment, the DDI agent 220 may operate without a GD and facilitate transmission of local beliefs to GDs located on other client devices 108.

If the GD 224 determines that the DDI network 100 is in an anomalous state, e.g., there is a high probability of a security breach and/or operational failure existing somewhere in the DDI network 100, the GD 224 may raise an alarm. This alarm may be transmitted to the OS 208 as well as other client devices 108. This may facilitate detection of, e.g., self-propagating worm traffic through the nodes of the DDI network 100. In an embodiment, the client device 108a may use this alarm to trigger an autonomic response, such as restricting the traffic on the NIC 228. Such a response, used to combat the spread of a worm, would naturally impair normal operation of the client device 108a.

In an embodiment, the dedicated partition 216 may also include a network access control (NAC) agent 232. The NAC agent 232 may enjoy similar securities as the DDI agent 220 through operation in the dedicated partition 216. This may allow for the NAC agent 232, acting as a trusted agent on the client device 108a, to operate in conjunction with other network entities, e.g., the authentication node 104, in order to authenticate security configurations of the client device 108a. These authentications may facilitate enforcement of security compliance for device membership to a limited access network or "overlay network," e.g., the DDI network 100.

Figure 3:
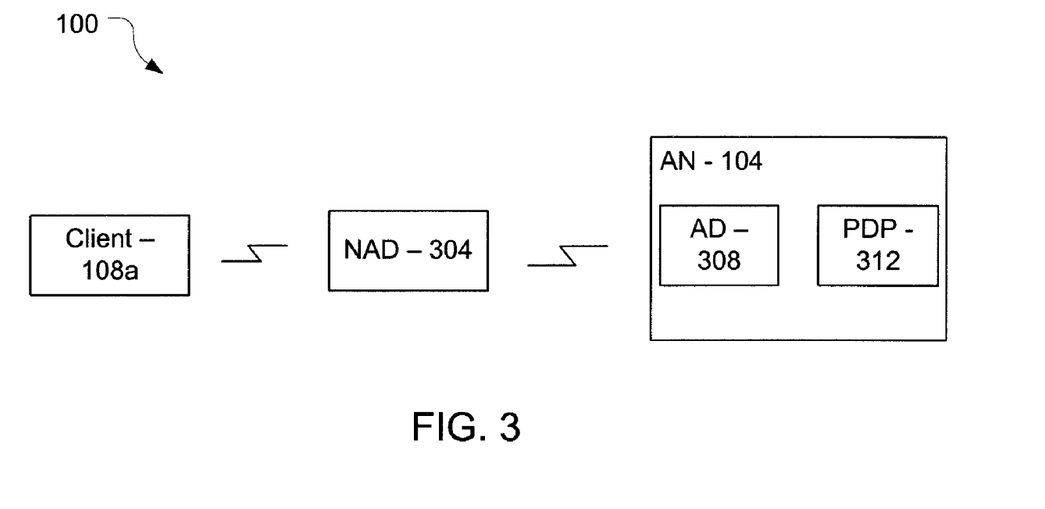
FIG. 3 schematically illustrates components of a distributed detection and inference network in accordance with various embodiments of this invention.

FIG. 3 illustrates components of the DDI network 100 in accordance with various embodiments of the present invention. The authentication node 104, which may be a NAC server, may be coupled to a client device 108, e.g., client device 108a, through a network access device (NAD) 304. The NAD 304 may serve as an entry point to provide the client 108a with access to other nodes of the DDI network 100, e.g., the authentication node 104 and/or other client devices 108, as well as other devices not specifically shown. The NAD 304 may be a stand-alone device and/or be incorporated as part of another network device such as a network bridge, router, or switch.

Figure 4:
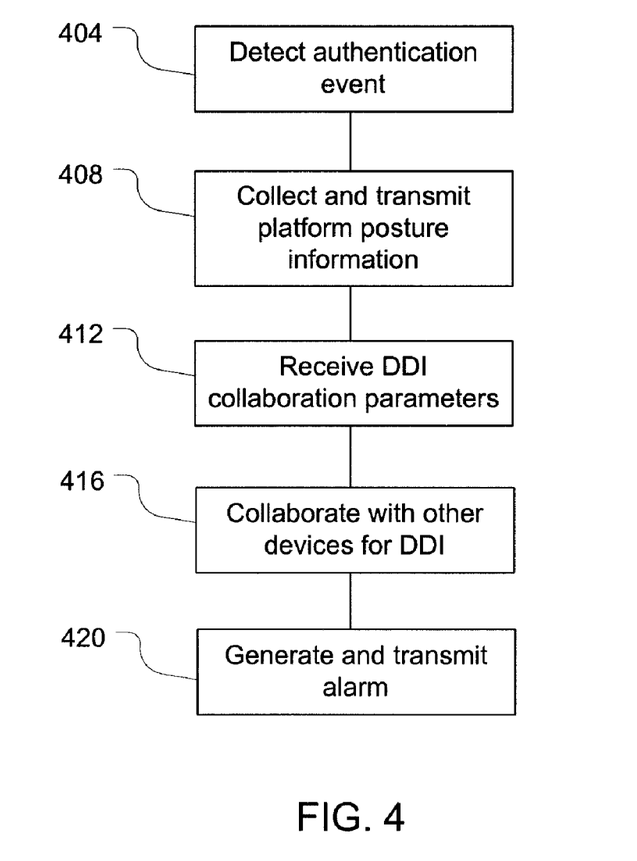
FIG. 4 illustrates operation of a client device in accordance with various embodiments of this invention.

The client device 108a may work with the authentication node 104 for authentication and collaborate with other client devices 108 for DDI as shown in FIG. 4 in accordance with various embodiments of the present invention. Upon detection of an authentication event, e.g., a power-on event, an event signifying client device 108a has come within the transmission/reception range of NAD 304, or a periodic update, the client device 108a may engage in an authentication operation with the authentication node 104, through the NAD 304, that is designed to procure a network policy to control the client device 108a access and/or participation with the DDI network 100, block 404.

The NAC agent 232 may collect platform posture information about the client device 108a, e.g., version of security component, configuration settings, etc., in an OS independent manner. This posture information may then be transmitted to the authentication node 104, block 408. The NAC agent 232 may attest to this posture information by signing it with a public key (asymmetric key) that is shared between the NAC agent 232 and the authentication node 104 within a secure message envelope that is difficult to modify or inspect by third parties en-route. In this manner, the NAC agent 232 may exchange information, assuring its integrity and authenticity with the authentication node 104.

An authentication device 308 of the authentication node 104 may receive and verify the platform posture information collected and transmitted by the NAC agent 232, block 408. Based on the platform posture information, a policy decision point (PDP) device 312 of the authentication node 104 may formulate and communicate the network policy to the NAD 304 and/or the client device 108a. The network policy may include access parameters and/or DDI collaboration parameters to control client device's 108a access to, and operation in, the DDI network 100. In an embodiment, access parameters may be communicated to the NAD 304 while DDI collaboration parameters may be communicated to the client device 108a. The authentication device 308 and the PDP 312 may be co-located in the same device or separate from one another.

Upon receiving the DDI collaboration parameters of a network policy, block 412, the DDI agent 220 may collaborate with one or more client devices 108 for DDI, block 416. This collaboration may include passing messages between the client devices 108 of the DDI network 100 according to the DDI collaboration parameters. In various embodiments, these messages may include aggregation requests and/or local beliefs. If, as a result of this collaboration, an event is detected, the DDI agent 220 may generate and transmit a global belief (e.g., an alarm), block 420.

In various embodiments, the network policy, or portions thereof, may be periodically updated through subsequent authentication operations performed by the authentication node 104. Periodic authentication operations may be performed in order to maintain current information about nodes of the DDI network 100. This periodic authentication may also be an opportunity to update the DDI collaboration parameters to facilitate secure and efficient messaging. This periodic updating of the network policy may define DDI epochs. With the NAC agent 232 and the DDI agent 220 operating in the dedicated partition 216 it may be that the entire client device 108a need not be powered up to perform these periodic updates and/or any other of the operations described in FIG. 4.

In general, the DDI collaboration parameters may be information on which nodes are available for DDI messaging and how to pass DDI messages to those nodes. This information may be used to secure DDI messaging and to thwart an attempt by a malicious agent, e.g., a compromised host, to infiltrate or disrupt a DDI operation by, e.g., sending forged messages.

In various embodiments, the DDI collaboration parameters may include information on trusted DDI collaborators, e.g., other client devices 108 with which the client device 108a may safely exchange beliefs. The DDI agent 220 may share a local belief generated by the LD 212 with one or more other nodes of the DDI network 100 randomly selected from the collaborator list. This random selection may frustrate an adversary by preventing it from predicting/knowing which nodes participate in DDI and thus may help to evade attempts to interfere with DDI.

Providing the DDI agent 220 with the list of trusted collaborators may allow for the DDI agent 220 to gain this knowledge without scanning network addresses in an attempt to determine other participating agents, which may appear like a malicious host scanning for vulnerabilities. Also, knowledge of valid messaging partners may make random messaging more efficient, e.g., because it may be more likely that a message will be received by a participating node. This may allow for detection of a security breach to occur faster. This may also allow for the DDI messages to outrace an attacker.

At any one time, the DDI agent 220 may only need to know of a small set of possible neighbors, e.g., ten, to which it may transmit a belief. In an embodiment, when the DDI agent 220 transmits a belief to another client device 108 of the DDI network 100, the address of the target client device 108 may be revealed to a possible adversary. Therefore, receiving multiple addresses in the collaborator list may allow for the DDI agent 220 to avoid repeated transmissions to the same client device 108. The number of neighbors' addresses may be determined by the messaging rate compared to the rate at which the collaborator list is replenished by the authentication node 104 periodically updating the collaboration parameters of the network policy.

The DDI collaboration parameters may also include message security mechanisms designed to facilitate secure communication of beliefs between the DDI agent 220 and one or more of the client devices 108 of the DDI network 100. In various embodiments, these message security mechanisms may include secret values, keys, algorithms, and/or hash functions sent to the DDI collaborators.

In an embodiment, messages passed between nodes of the network may be secured by way of a unique encryption key distributed to each of the DDI agents. To identify who originated a forgery, a common key may not be used among all DDI agents, and the number of keys may be on the order of the number of DDI agents of the DDI network 100. Messages transmitted within this scheme may be done so using secure sockets layer (SSL) or transport layer security (TLS) cryptographic protocols. While key encryption of the messages may secure the messages, it may also burden the messaging scheme with additional computation and increase the size of the message by an amount larger than the DDI belief message itself.

DDI may be designed to operate with small messages, e.g., between a few bytes and hundreds of bytes, that may be passed around fast enough to outrace a worm. Such messaging economy may be achieved by user datagram protocol (UDP) style "best efforts" messages that may be secured by secret values (e.g., large integers known only to collaborating nodes, which could be as simple as a 32-bit unsigned integer (UINT32), transmitted through the DDI collaboration parameters. A receiving DDI agent may know or be able to predict what the secret value is and discard counterfeit messages without needing encryption. Secrets may then be included in the message in open text, or "lightly" encoded, along with the numbers conveying a node's belief. Because the chances of an adversary guessing the secrets and forging a message may be small within the lifetime of the message, a belief message containing a verified secret value may ensure that the message came from a node that has been authenticated by the authentication node 104.

In an embodiment, secret values may not be reused in order to reduce the consequence of exposing them to an adversary. In this way even if an adversary could read the secret in the message, there would be no benefit to the adversary in forging a message with the secret value. To provide this, each address on the collaborator list may have a secret value associated with it known only by the DDI agent at that address. Once a DDI agent used an address-secret pair from the list, it may cross that pair from the list. The secret values list may be updated with the periodic authentication performed by the authentication node 104.

While DDI messaging may occur on the order of seconds and the periodic updates from the authentication node 104 may occur on the order of minutes, it may be that a relatively large number of secret values may be distributed through the DDI collaboration parameters to provide for a single-use limitation. Therefore, in another embodiment, each DDI agent may generate new secrets in each DDI messaging exchange by an algorithm, e.g., a hash chain, provided in the DDI collaboration parameters. This may reduce the number of single-use secrets distributed through the DDI collaboration parameters. In various embodiments, a hash chain distributed through the DDI collaboration parameters may be accompanied by a secret key to determine the sequence of secret values generated by the hash chain and/or an initial secret value by which such sequences may be synchronized. A variety of hash-chain based messaging schemes may be used in various embodiments, e.g., similar to those used in an S/Key one-time password scheme.

In an embodiment the DDI collaboration parameters may provide a hash function as a message security mechanism. The DDI agent 220 may use the hash function to hash the belief and form the message from the belief and its hashed value. The receiving DDI agent could verify the message hash and be assured that only another DDI agent that possessed the hash function could have generated the message. In a similar manner the DDI agent 220 may send a hash of a secret value for verification by the receiving node. While these hashing signatures may slightly increase the size of the message payload and the computational cost of interpreting the message, it may serve as a defense to a man-in-the-middle attack.

The random, transient nature of the message passing may provide security mechanisms in and of itself so that even lightly encrypting the messages may not be necessary in some embodiments. It may be exceedingly difficult for an adversary to forge imposter messages given the system of rapid transmissions to randomly selected recipients. The probability of defeating such a system may be the product of two small numbers: the first, the probability an adversary could listen in to DDI traffic and predict the destination of messages, times the second, the probability that an adversary could generate an impostor message within the instant while the message exchange was taking place, given they were able to detect and guess the destination of the transient messages.

With enough time an adversary may conceivably guess who might be the next message recipient and guess one of the secret values; or see enough examples from the secret hash chain to guess the hash function; or mimic a message fast enough by transmitting a forgery that outraced a legitimate response upon hearing the response. DDI may provide robustness against such attacks in two ways. First, because information used for inference expires rapidly, an adversary would be challenged to inject "tainted" information in a timely manner, even if it could be forged. Second, the inference algorithm may assume that the local beliefs are noisy, with false positive rates exceeding several percent in the many cases, and, therefore, a "significant" sample of local beliefs may need to be observed to come to a decision. Thus, a few malicious nodes may not taint the global detection results. The bounds on how many malicious nodes the DDI system would tolerate may depend on the DDI model inference parameters; however, DDI has been shown to be robust to parameters that are "off-design."

A variety of different DDI messaging sequences may be used to leverage the security mechanisms discussed above in embodiments of this invention. A first one of these DDI messaging sequences may be referred to as ephemeral single message passing (ESMP). In ESMP there may be just one message passed in the sequence. Participating DDI agents may use a shared secret key when they choose another DDI agent at random to which to send a message. This process may be repeated in each DDI epoch with a subsequent secret. If all DDI agents synchronize their transmissions, and all messages containing the current secret were simultaneous, an adversary who heard the secret would have no ability to reuse the secret after the messages were received. Secrets in subsequent epochs would be generated by each node by the common hash chain, as described. This scheme relies on synchronization of secrets by synchronization of epochs among DDI agents. Since DDI agents could hear the secret in the current epoch, they could re-sync themselves in subsequent epochs should they ever lose track of the epoch.

Figure 5:
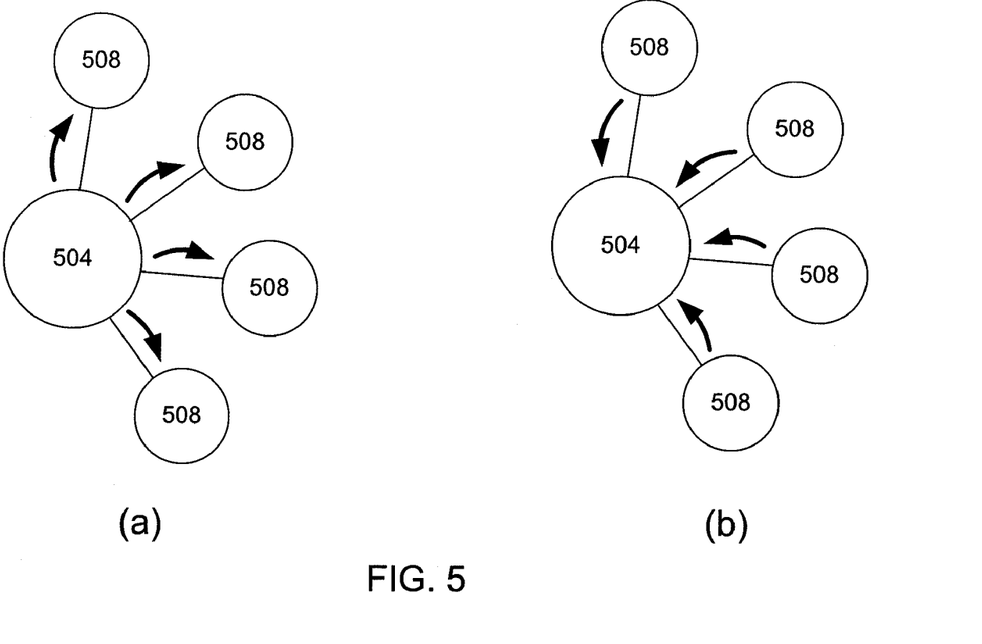
FIG. 5 illustrates a distribute-collect message passing scheme in accordance with various embodiments of this invention.

As discussed above, random, transient aspects of messaging may be exploited to improve security. Conversely, it may improve distributed detection to have some predetermination of messaging structure; that is, messaging which would not be completely random. This may allow, e.g., messages to collect at DDI agents having GDs to perform inferences. In some embodiments, a single hop distribute-collect message passing (SHDCMP) scheme may provide the benefits of both dynamic, random messaging and the concentration of information at a single node. FIG. 5 illustrates an SHDCMP scheme in accordance with various embodiments of the present invention. In a request phase, shown in FIG. 5a, an aggregation node 504 containing the global detector, e.g., client device 108a, may send outgoing aggregation requests containing a secret to a set of random detection nodes 508 having LDs, selected from the collaborator list. This may create a temporary cluster of nodes. In a collection phase, shown in FIG. 5b, the detection nodes 508 may then reply to the aggregation node 504 that originated the request with their local beliefs. The messages transmitting the local beliefs may include the next secret in the hash chain for verification by the aggregation node 504. In this way an adversary node that listened in on the request could not guess the return secret and forge a reply message on the second pass.

Figure 6:
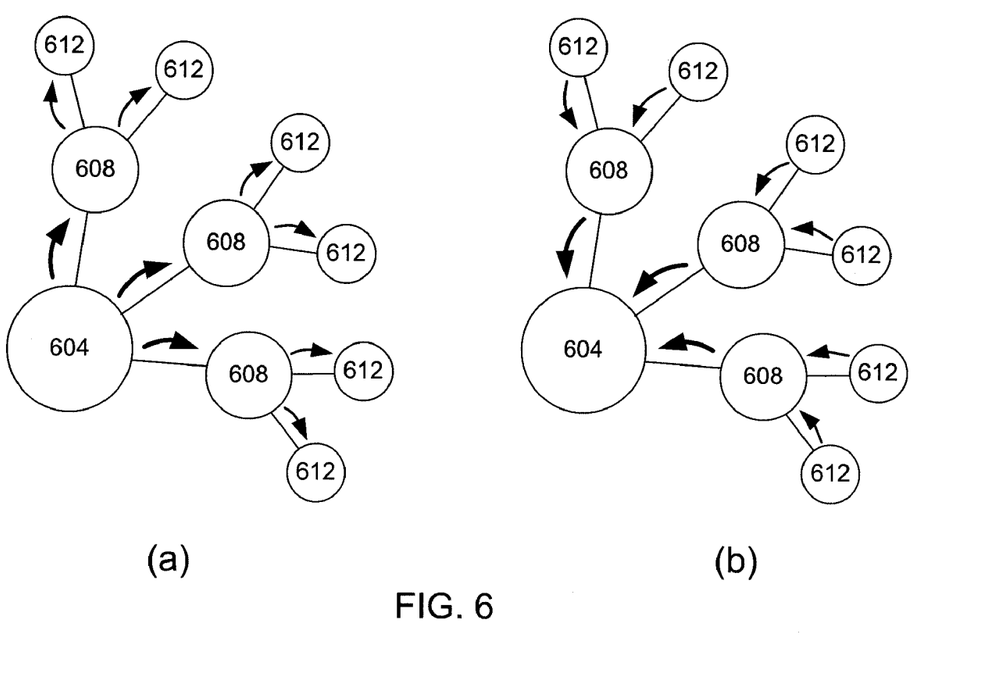
FIG. 6 illustrates another distribute-collect message passing scheme in accordance with various embodiments of this invention.

The SHDCMP may be extended to create a multiple-hop distribute-collect message passing (MHDCMP) illustrated in FIG. 6 in accordance with various embodiments of the present invention. As with the SHDCMP, MHDCMP may be separated into a request phase, shown in FIG. 6a, and collection phase, shown in FIG. 6b. An aggregation node 604 may issue an aggregation request to a set of randomly selected detection nodes 608. These nodes 608, which may be referred to as first-level nodes 608, may then issue aggregation requests to other sets of randomly selected detection nodes 612, which may be referred to as second-level nodes 612. Upon receiving the requests, the second-level nodes 612 may "fold back the tree" by replying to their spanning tree parents, e.g., the first-level nodes 608, with their local beliefs. The first-level nodes 608 may then propagate the beliefs (their own and/or any received from second-level nodes 612) back toward the aggregation node 604. Any number of levels may be used in a similar manner.

In an MHDCMP, each node may update its secret with a subsequent one from the hash chain before sending out the next message. If each branch were to use the same hashing sequence, there may be a reuse on the branch. This may be avoided by nodes skipping ahead in the sequence. It may be possible that an inference scheme would come to a conclusion partway along the return path, and not need to complete the messaging back to the tree root.

Messaging sequences may be modified within the scope of embodiments of this invention. For example, in an embodiment a distribution request may come from a node other than the aggregation node. For example, an authentication node may send out an aggregation request to client devices and the client devices may forward their belief to a designated aggregation node. The aggregation node may be designated through the DDI collaboration parameters, through the aggregation request, or by some other way.

In various embodiments, the generation and distribution of collaborator lists may be dependent upon the messaging scheme that is employed. For example, in an MHDCMP embodiment, collaborator lists sent to the first-level nodes 608 may have different characteristics than lists sent to the second-level nodes 612. For example, collaborating lists sent to first-level nodes 608 may not include common second-level nodes 612 so that multiple first-level nodes 608 are not sending a request to the same node. Furthermore, the collaborator lists may also indicate permissible actions of collaborating nodes. For example, a particular first-level node 608 may receive a collaborator list indicating authenticated aggregation nodes, from which it may receive genuine authentication requests, and authenticated second-level detection nodes, to which it may forward any received aggregation requests.

Comprehensive management of the distributed collaborating lists by an authentication node may facilitate the collaborating nodes being able to randomly select recipient nodes from their respective collaborator list while still being within an overall structure of the message passage scheme.

A malicious node may attempt to imitate an aggregation node to initiate a DDI exchange. However, since the malicious node may not elicit action, just information, the effect, were this to occur, may be relatively benign. Nevertheless, the risk of this happening may be reduced by seeding a probabilistically small number of legitimate starting secrets that an impostor would have to guess, for example, by making the secrets all members of one chain. Membership in a chain may be detected by iterating through the chain, as is done in reverse hash chain algorithms. This chain may be renewed at each distribute-collect cycle. Alternatively, the initiator of a chain could be authenticated by sending out both a random integer and its hashed value concatenated in the initiator's message. If the hashing function could not be duplicated except by nodes that had the secret seed, then the impostor could not generate a valid random integer—hashed value pair.

Figure 7:
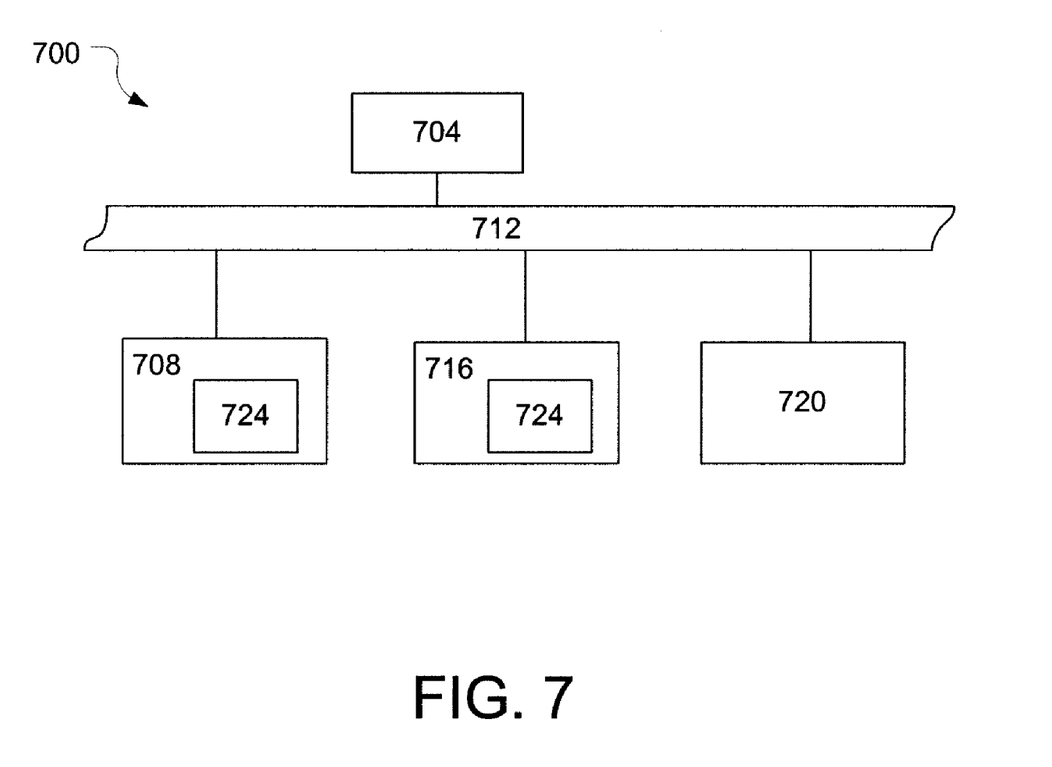
FIG. 7 illustrates a system in accordance with various embodiments of this invention.

FIG. 7 illustrates a computing device 700 capable of implementing a DDI node in accordance with various embodiments. As illustrated, for the embodiments, computing device 700 includes one or more processor(s) 704, memory 708, and bus 712, coupled to each other as shown. Additionally, computing device 700 includes storage 716, and one or more communication interface(s) 720 coupled to each other, and the earlier described elements as shown. The components of the computing device 700 may be designed to provide the host and dedicated partitions as described above in any of a variety of ways including physical partitions, virtual partitions, or a combination of the two.

Memory 708 and storage 716 may include, in particular, temporal and persistent copies of DDI logic 724, respectively. The DDI logic 724 may include instructions that when accessed by the processor(s) 704 result in the computing device 700 performing operations or executions described in conjunction with the DDI nodes in accordance with embodiments of this invention. In particular, the accessing of the DDI logic 724 by the processor(s) 704 may facilitate authentication and DDI collaboration of the DDI nodes as described above in connection with various embodiments.

In various embodiments, the memory 708 may include RAM, dynamic RAM (DRAM), static RAM (SRAM), synchronous DRAM (SDRAM), dual-data rate RAM (DDRRAM), etc.

In various embodiments, the processor(s) 704 may include one or more single-core processors, multiple-core processors, controllers, application specific integrated circuits (ASICs), etc.

In various embodiments, storage 716 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc. Storage 716 may be a storage resource physically part of the computing device 700 or it may be accessible by, but not necessarily a part of, the computing device 700. For example, the storage 716 may be accessed by the computing device 700 over a network.

In various embodiments, computing device 700 may have more or less elements, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   an network access control agent, configured to be instantiated in a first partition of the apparatus, and to establish secure communication with an authentication device of a network to authenticate the apparatus in accessing the network; and
   a distributed detection and inference (DDI) agent, coupled to the network access control agent, configured to be instantiated in the first partition, to receive, when the apparatus is permitted to access the network, DDI collaboration parameters from the authentication device, and to collaborate with one or more node devices on the network based at least on the received collaboration parameters;
   wherein the network access control agent and the DDI agent are configured to operate independently of an operating system (OS) of a second partition of the apparatus, and the collaboration parameters are generated depending on a scheme based on which the DDI agent is configured to collaborate with the one or more node devices on the network,
   wherein the first and second partitions are different partitions, and
   wherein the operating system is executed by a processor of the apparatus.

2. The apparatus of claim 1, wherein the DDI collaboration parameters comprise a message security mechanism configured to facilitate secure communication of one or more beliefs between the apparatus and the one or more node devices of the network.

3. The apparatus of claim 2, wherein said message security mechanism is one or more secret values and/or a hash value function.

4. The apparatus of claim 1, wherein the DDI collaboration parameters comprise a list of node devices of the network with which the DDI agent may communicate one or more beliefs.

5. The apparatus of claim 4, further comprising:
   a local detector, coupled to the DDI agent and configured to be instantiated in the second partition of the apparatus, and to generate a local belief indicating a probability that there is a security breach and/or operational failure within the network.

6. The apparatus of claim 5, wherein the DDI agent comprises a global detector configured:
   to receive the local belief from the local detector;
   to receive, another local belief from another local detector of a node device from the list, the another local belief indicating another probability that there is a security breach and/or operational failure within the network; and
   to generate a global belief indicating yet another probability that there is a security breach and/or operational failure within the network, the global belief based at least in part on the local belief and the another local belief.

7. The apparatus of claim 1, wherein the network access control agent is further configured to periodically authenticate security configurations of the apparatus with the authentication device, and wherein the DDI agent is further configured to receive an update to the DDI collaboration parameters with each subsequent successful authentication.

8. A method comprising:

instantiating, by an apparatus, an network access control agent in a first partition of the apparatus;

instantiating, by the apparatus, a distributed detection and interference (DDI) agent in the first partition of the apparatus;

establishing, by the network access control agent, secure communication with an authentication device of a network to authenticate the apparatus in accessing the network;

receiving, by the DDI agent via an interface, DDI collaboration parameters from the authentication device when the apparatus is permitted to access the network; and collaborating, by the DDI agent, with one or more node devices of the network for DDI based at least in part on said received DDI collaboration parameters;

wherein the network access control agent and the DDI agent are configured to operate independently of an operating system (OS) of a second partition of the apparatus, and the collaboration parameters are generated depending on a scheme upon which the DDI agent is configured to collaborate with and the one or more other node devices on the network, wherein the first and second partitions are different partitions, and wherein the operating system is executed by a processor of the apparatus.

9. The method of claim 8, wherein the DDI collaboration parameters include a list of collaborating node devices and said collaborating with one or more node devices based at least in part on the received DDI collaboration parameters further comprises:

randomly selecting a node device from the list; and
transmitting a local belief to said randomly selected node device.

10. The method of claim 9, wherein the DDI collaboration parameters further comprises a security mechanism and said transmitting of the local belief to said randomly selected node device further comprises:

securing transmission of said local belief with said security mechanism.

11. An article of manufacture, comprising:

a non-transitory tangible machine-accessible medium;
a plurality of programming instructions stored in the non-transitory tangible machine-readable storage medium, configured to program an apparatus and enable the apparatus, in response to execution of the programming instructions by the apparatus, to perform instantiating an network access control agent in a first partition of the apparatus;

instantiating a distributed detection and interference (DDI) agent in the first partition of the apparatus;

establishing, by the network access control agent, secure communication with an authentication device of a network to authenticate the apparatus in accessing the network;

receiving, by the DDI agent via an interface, DDI collaboration parameters from the authentication device when the apparatus is permitted to access the network; and collaborating, by the DDI agent, with one or more node devices of the network for DDI based at least in part on said received DDI collaboration parameters;

wherein the network access control agent and the DDI agent are configured to operate independently of an operating system (OS) stored on a second partition of the apparatus, and the collaboration parameters are generated depending on a scheme upon which the DDI agent is configured to collaborate with and the one or more other node devices on the network, wherein the first and second partitions are different partitions.

12. The article of manufacture of claim 11, wherein said DDI collaboration parameters includes a list of collaborating node devices and said collaborating includes randomly selecting a node device from the list; and
transmitting a local belief to said randomly selected node device.

13. A system comprising:

an authentication device configured to communicate with a node device via a network to authenticate security configurations of the node device;

a policy decision point (PDP) device communicatively coupled to the authentication device and configured to transmit distributed detection and inference (DDI) collaboration parameters to the node device via the network based at least in part on authentication of security configurations of the node device, wherein the authentication device is further configured to periodically communicate with the node device to authenticate security configurations, and the PDP device is further configured to periodically update the DDI collaboration parameters;

an authentication network access control agent, configured to be instantiated in a first partition of the node device, and to establish secure communication with an authentication device; and a distributed detection and inference (DDI) agent, coupled to the authentication network access control agent, configured to be instantiated in the first partition, to receive, when the node device is permitted to access the network, the DDI collaboration parameters from the authentication device, and to collaborate with one or more other node devices on the network based at least on the received collaboration parameters;

wherein the authentication network access control agent and the DDI agent are configured to operate independently of an operating system (OS) of a second partition of the node device, and the collaboration parameters are generated depending on a scheme upon which the DDI agent is configured to collaborate with and the one or more other node devices on the network, wherein the first and second partitions are different partitions, and wherein the operating system is executed by a processor of the node device.

14. The system of claim 13, wherein the DDI collaboration parameters comprise a message security mechanism configured to facilitate secure communication of one or more beliefs between the node device and one or more other node devices of the network.

15. The system of claim 13, wherein the DDI collaboration parameters comprise a list of collaborating node devices of the network with which the node devices may communicate one or more beliefs.

* * * * *